United States Patent [19]

Shibata et al.

[11] 4,372,504
[45] Feb. 8, 1983

[54] MAGNETIC RECORD TAPE PROTECTIVE DEVICE FOR A TAPE CASSETTE

[75] Inventors: Tsutomu Shibata, Hachioji; Kenji Kimura, Tachikawa; Ken Satoh, Akigawa; Sinichi Saitou, Hachioji; Toshikazu Kato, Hino; Seizo Watanabe; Ken Ohshima, both of Hachioji, all of Japan

[73] Assignee: Olympus Optical Co., Ltd., Tokyo, Japan

[21] Appl. No.: 199,223

[22] Filed: Oct. 21, 1980

[30] Foreign Application Priority Data

Oct. 26, 1979 [JP] Japan .......................... 54-148561[U]
Oct. 26, 1979 [JP] Japan .......................... 54-148562[U]

[51] Int. Cl.³ .......................... G03B 1/04; G11B 15/32
[52] U.S. Cl. .................................................. 242/198
[58] Field of Search .............................. 242/197–200; 360/96, 132, 60

[56] References Cited

U.S. PATENT DOCUMENTS 4,021,006 5/1977 Morimoto et al. .................. 242/199
4,022,402 5/1977 Morimoto .......................... 242/199
4,041,537 8/1977 Kishi .................................. 360/60
4,045,821 8/1977 Fujikura ............................ 360/132
4,173,319 11/1979 Umeda .............................. 242/199

FOREIGN PATENT DOCUMENTS 52-147419 11/1977 Japan .................................. 242/199

*Primary Examiner*—Leonard D. Christian
*Attorney, Agent, or Firm*—Frishauf, Holtz, Goodman and Woodward

[57] ABSTRACT

This invention is for a tape cassette having window for insertion of a magnetic head and a pinch roller formed extending from a peripheral wall of the housing of the tape cassette to one of the holding plates which holds a pair of reel hubs in place. The device according to this invention has a shutter member, and a resilient metal wire housed in the housing. The shutter member has projections which are to be engaged with an engaging member provided on a tape cassette holder member of the magnetic tape transport apparatus. The metal wire urges the shutter member to close a portion of the window formed in the holding plate. When the cassette is loaded into the loading member, the projections engage with the engaging member and the shutter member releases the closing state of the holding plate forming portion of the window against an urging force of the wire. When the cassette is removed from the loading member, the shutter member closes the holding plate forming portion to prevent the tape from being damaged by an external force.

18 Claims, 10 Drawing Figures

MAGNETIC RECORD TAPE PROTECTIVE DEVICE FOR A TAPE CASSETTE

BACKGROUND OF THE INVENTION

The present invention relates to a magnetic recording tape protective device for a tape cassette provided with a housing having a pair of holding plates for rotatively holding reel hubs, a peripheral wall coupled with the holding plates and windows extending through the peripheral wall and at least one of the holding plates, through which a pinch roller and a magnetic head are inserted, in which the magnetic recording tape wound around the reel hubs is prevented from being damaged by external force applied from the holding-plate forming portion of the window.

In the conventional tape cassette with such a window, the contact surface of a magnetic recording tape with the magnetic head is exposed to the peripheral-wall forming portion of the window. One of a pair of edges of the magnetic recording tape, which extends longitudinally, is exposed to the holding-plate forming portion of the window. Because of this construction, when he tape cassette is placed or carried while not housed in a cassette case covering the entire of the tape cassette, an external force may be applied onto the magnetic recording tape through the window. Particularly, when an external force is applied to the magnetic tape from the holding-plate forming portion of the window, the magnetic recording tape is pressed in the width direction to possibly be deformed or damaged. In this case, the magnetic tape may also be pulled out from the peripheral-wall forming portion, so that it may be deformed or damaged.

SUMMARY OF THE INVENTION

Accordingly, an object of the present invention is to provide a magnetic recording tape protective device for a tape cassette with a window which is free from the possibility of deformation or damage of the magnetic recording tape which may be caused by an external force applied from the holding-plate forming portion of the window.

In the following description, the direction "rightward" and "upwardly" refer to directions as viewed in the respective drawings.

DETAILED DESCRIPTION OF THE PREFERRED EMBODIMENT

Figure 1:
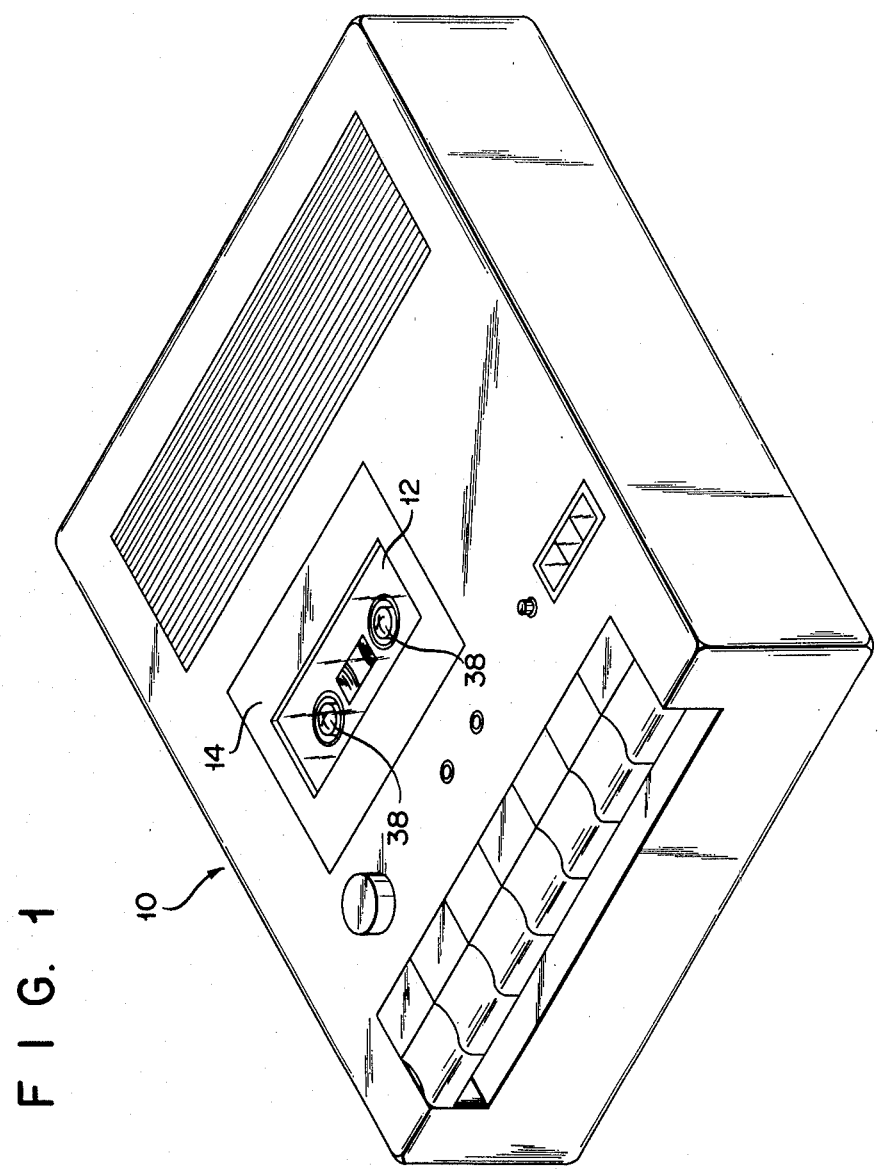
FIG. 1 is a perspective view of a magnetic record tape transport apparatus with a tape cassette loading section into which a tape cassette with a magnetic recording tape protective device is applied.

Referring to FIG. 1, there is shown a magnetic recording tape transport apparatus 10 using a tape cassette with a magnetic recording tape protective device which is an embodiment of the present invention. In this embodiment, the magnetic recording tape transport apparatus 10 is a video tape recorder. As shown in FIG. 1, the tape transport apparatus 10 is provided with a tape cassette loading section 14 to which a tape cassette 12 is removably loaded, as shown in FIG. 1.

Figure 2:
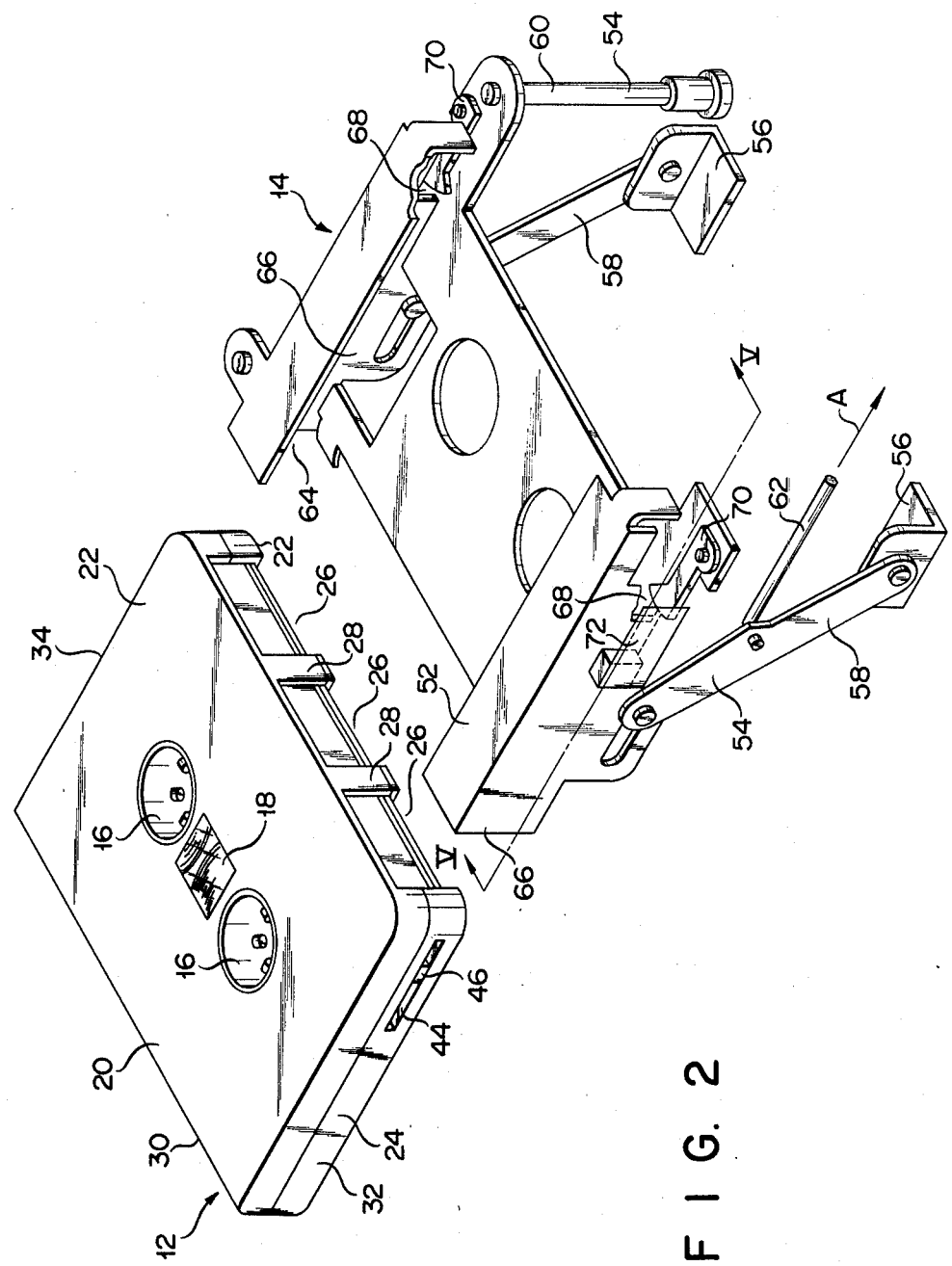
FIG. 2 is a perspective view of the tape cassette with the magnetic recording tape protective device of the invention and a tape cassette holder member.

In the present embodiment, the tape cassette 12 is comprised of a pair of reel hubs 16, a magnetic recording tape 18 wound around the pair of reel hubs 16, and a housing 20 accommodating the pair of reel hubs 16 and the magnetic recording tape 18, as shown in FIG. 2. The housing 20, as shown in FIG. 2, is provided with a pair of holding plates 22 for rotatively holding the pair of reel hubs 16, and a peripheral wall 24 formed continuously with the pair of holding plates 22 for connecting them. As shown in FIG. 2, a plurality of windows generally designated by reference numeral 26 are formed in the peripheral wall 24 and a part of one of the holding plates 22. Those windows allow a pinch roller, a magnetic head and a capstan, which are provided in the magnetic tape transport apparatus 10, to be inserted into the inside of the tape cassette when the tape cassette is loaded into the tape cassette loading section 14. The contact surface of the magnetic recording tape 18 with the magnetic head is exposed to the portions of the windows 26 formed in the peripheral wall 24 (referred to as peripheral-wall forming portions). One of the edges, which longitudinally extends, of the magnetic recording tape 18 as viewed in the width of the tape is positioned at the portions of the windows 26 formed in one of the holding plates 22 (referred to as holding-plate forming portions).

The housing 20 of the tape cassette 12 is shaped like a flat rectangular parallelepiped, as shown in FIG. 2. The peripheral wall 24 of the tape cassette 12 accordingly is divided into four sections: a front wall portion 28 having windows 26, a rear wall portion 30 disposed in opposition to the front wall portion 28, and right and left wall portions 32 and 34 connecting the front and rear wall portions 28 and 30.

Figure 3:
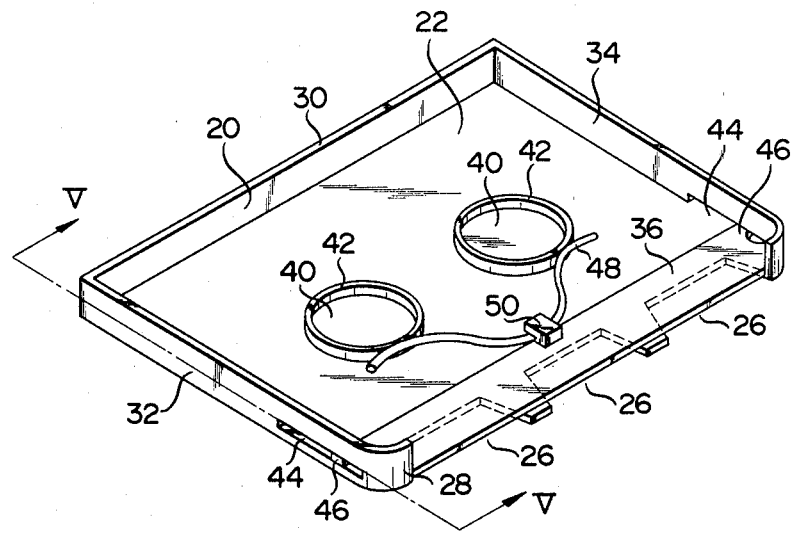
FIG. 3 is a perspective view of the tape cassette when the upper housing, a pair of reel hubs and the magnetic recording tape are removed from the tape cassette shown in FIG. 2, in which a shutter member is in a first position.
Figure 4:
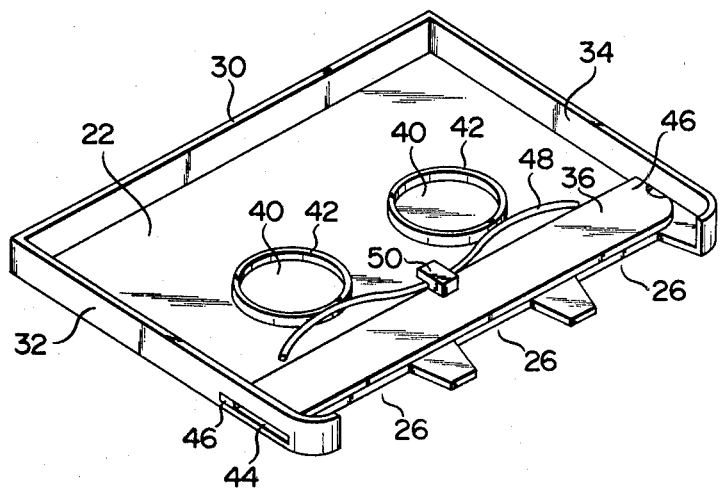
FIG. 4 is the same perspective view as that shown in FIG. 3, in which the shutter member is in a second position.

Referring to FIG. 3, a shutter member 36 is provided on the inner surface of one of holding plates 22 of the housing 20. A pair of holes 40, into which a pair of reel shafts 38 in FIG. 1 of the magnetic tape transport apparatus 10 are inserted, are formed in the lower holding plate 22. Projections 42 having ring like shape, respectively, are provided along the holes 40, projecting upwardly from the inner surface of the lower holding plate 22. The projections 42 are fitted into reel hubs to rotatively support the reel hubs 16, respectively.

The shutter member 36, shaped like a plate, is disposed between the pair of the reel hubs 16 and the front wall portion 28. The longitudinal length of the shutter member 36 is substantially equal to a distance between the inner surfaces of the right and left wall portions 32 and 34 so that the shutter member 36 is movable within the tape cassette along the inner surfaces of the wall portions 32 and 34. When the shutter member 36 contacts with the front wall portion 28 of the peripheral wall 24, the shutter member 36 closes the holding-plate forming portion. The position of the shutter member 36 at this time will be referred to as the first position.

Elongated holes 44 are formed at the locations of the right and left wall portions 32 and 34 where these slidingly contact with the shutter member 36, extending in the longitudinal direction of the side wall portions 32 and 34. Projections 46 projecting from both sides of the shutter member 36 are disposed in the elongated holes, respectively. When the shutter member 36 is in the first position, the projections 46 are positioned separated from the front ends of the elongated holes 44. When the shutter member 36 moves toward the rear wall portion 30 and the projections 46 reach the rear ends of the elongated holes 44, respectively, the shutter member 36 releases from the closing state of the holding-plate forming portion.

An urging means 48 is disposed between the shutter member 36 and the ring-like projection 42, as shown in FIG. 3. The urging means 48, which is a resilient metal spring such as a steel wire, is incurved toward the center of the urging means 48, as shown in FIG. 3. The urging means 48 contacts at both end portions with the ring-like projections 42. The incurved center of the urging means 48 is in contact with an urging means holder 50 on shutter member 36. The holder 50 has a stepped portion to hold the urging means 48 and to limit the upward movement of the urging means 48. In this way, the urging means 48 is compressedly held between the ring-like members 42 and the holder 50 to urge the shutter member 36 and to hold it in the first position, as shown.

Referring to FIG. 2, there is shown major part of the tape cassette loading section 14 of the magnetic tape transport apparatus 10. As shown, the tape cassette loading section 14 is provided with a tape cassette holder member 52 which removably holds the tape cassette 12. The holder member 52 is mechanically coupled with a moving mechanism 54 for moving the tape cassette holder member 52 vertically.

Contained in the moving mechanism 54 are supporting members 56 fixed to a chassis (not shown) of the magnetic tape transport apparatus 10 and a pair of levers 58 rotatively coupled at both ends with the supporting member 56 and the tape cassette holder members 52, as shown, and a guide bar 60 provided between the chassis and the tape cassette holder member 52.

When an operating roc 62 coupled with one of the levers 58 is moved in the direction of an arrow A, the tape cassette holder member 52 is guided by the guide bar 60 upwardly, the cassette 12 held in the tape cassette holder member 52 is removed from the magnetic tape transport apparatus. When the operation rod 62 moves in the reverse direction, the holder member 52 is guided downwardly. When the holder member 52 reaches a lower position, the holder member 52 sets the tape cassette 12 held by the tape cassette holder member 52 to the tape transport apparatus 10, as shown in FIG. 1.

The tape cassette holder member 52, which is of the known kangaroo pocket type, is provided with an opening 64 having substantially the same configuration and area as those of the front wall portion 28 of the peripheral wall 24 of the tape cassette 12, which the opening is arranged substantially in parallel with the vertical movement path of the tape cassette holder member 52. When the tape cassette 12 is inserted into the opening of the holding member 52 in the longitudinal direction of the elongated holes 44, the tape cassette 12 is inserted into and set in the holder member 52. Openings 68 are formed on the side walls 66 of the holder member 52, facing the corresponding side wall portions 32 and 34 of the tape cassette 12. The openings 68 face the movement paths of the elongated holes 44 of the side wall portions 32 and 34. One end of each of the engaging members 70 is inserted into a respective opening 68. The engaging members 70 are rotatively coupled with the holder member 52.

Each of the engaging members 70 is rotatable about the other end thereof between first and second positions in a plane extending in the longitudinal direction of the elongated holes 44 of the tape cassette 12 inserted in the tape cassette holder member 52. When the engaging members 70 are in the first position, the one ends of the engaging members 70 are positioned on the movement paths in the elongated holes 44 of the tape cassette 12 inserted into the holder member 52. When the engaging members 70 are in the second position, the one ends of engaging members 70, respectively, are off the movement paths in the elongated holes 44 of the tape cassette 12 inserted into the tape cassette holder 52.

The one ends of the engaging members 70 disposed in the first position contact with an urging means 72 fixed to the side wall 6 of the cassette holder member 52, as shown in FIG. 2. The urging means 72 is a plate spring to urge the engaging means 72 and to hold it in the first position.

Figure 5:
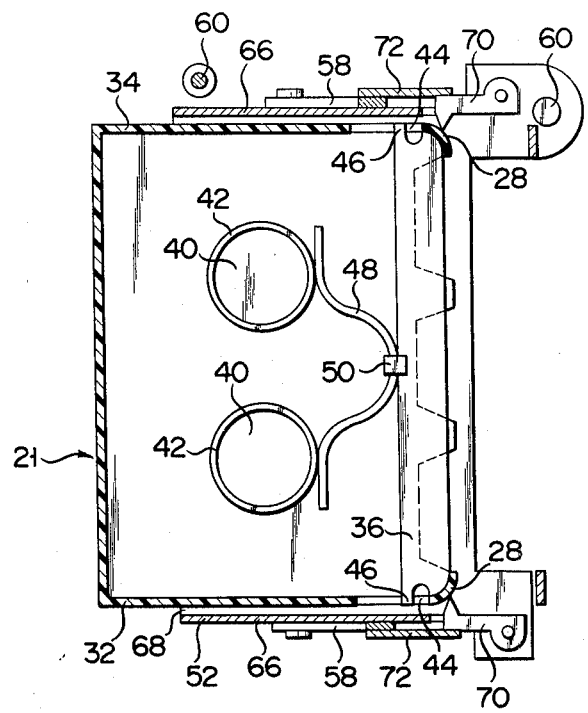
FIG. 5 is a plan view of a tape cassette taken on line V—V in FIG. 3 inserted into a cassette holder taken on line V—V in FIG. 2 showing the engaging member in a first position.
Figure 6:
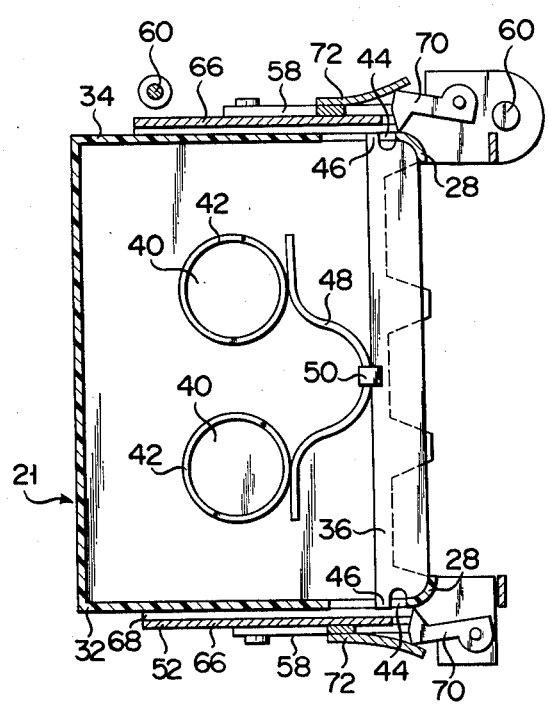
FIG. 6 is a plan view illustrating the engaging member in FIG. 5 slide-contacting the front wall portion of the peripheral wall of the housing of the tape cassette in FIG. 5 in a second position, resisting the urging force of an urging means.

The tape cassette 12 inserted into the holder member 52 through the opening 64 first contacts as the one ends of the engaging members 70 disposed in the first position the front wall portion 28 of the tape cassette 12, as shown in FIG. 5. At this time the one ends of the engaging members 70 are located on the movement path of the tape cassette 12. Therefore, engaging members 70 move against the urging force to be disposed in the second position, as shown in FIG. 6, as the tape cassette goes in.

Figure 7:
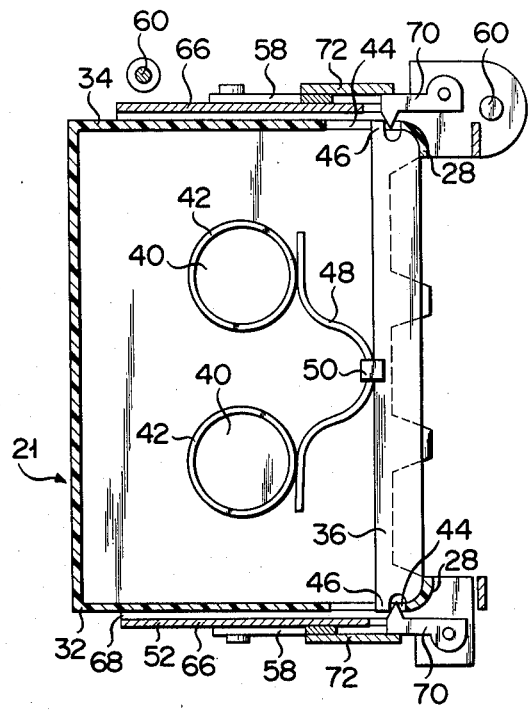
FIG. 7 is a plan view illustrating the engaging member in FIG. 5 engaging the front ends of a pair of elongated holes of the housing of the tape cassette in FIG. 5, in which the shutter member is in the first position.

When the tape cassette 12 is further inserted into the holder member 52, the one ends of the engaging members 70, respectively, are inserted into the elongated holes 44, while engaging the front ends of the holes 44, as shown in FIG. 7. Then, by the urging force of the urging means 72, the engaging members 70 return to the first position, and the one ends contact the projections 46 of the shutter member 36.

Figure 8:
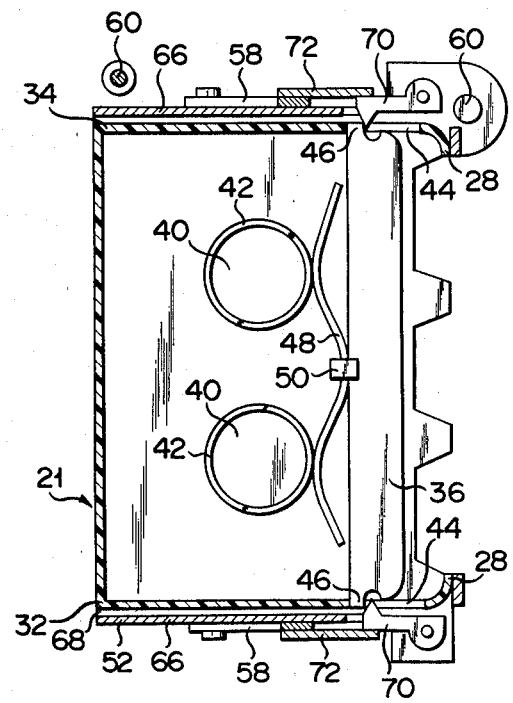
FIG. 8 is a plan view illustrating the tape cassette in FIG. 5 fully loaded into the tape cassette holder member in FIG. 5, in which the shutter member is in a second position.

With further progression of the tape cassette 12 into the holder member 52, the projections 46 engaging with the one ends of the engaging member 70 move toward the rear ends of the elongated holes 44 of the tape cassette 12, as shown in FIG. 8, while at the same time the shutter member 36 moves against the urging force of the urging means 48 to the second position, as shown in FIG. 8. At the stage where the shutter member 36 completes the movement to the second position, the loading of the cassette 12 into the tape holder member 52 is completed. Upon the completion of the movement of the shutter member 36, the holder member 52 moves to the second position by means of the moving mechanism 54, as previously stated.

For removing the tape cassette 12 from the tape cassette holder member 52 disposed in the upper position, the shutter member 36, the urging means 48, the projections 46, the engaging members 70 and the urging means 72 are operated in the reverse order to the above-mentioned one when the cassette 12 is loaded, i.e. in the order of FIGS. 8, 7, 6 5 and 2. When the one ends of the engaging members 70 depart from the front ends of the elongated holes 44 of the tape cassette 12, the urging means 48 locates the shutter member 36 in the first position, to close the holding-plate forming portion.

Incidentally, the elongated holes 44, the projections 46 and the engaging member 70 cooperate to form a drive mechanism.

A modification of the embodiment of the present invention as mentioned above will be described referring to FIGS. 9 and 10. In the present modification, same reference numerals are used for designating like or equivalent portions in the above-mentioned embodiment.

Figure 9:
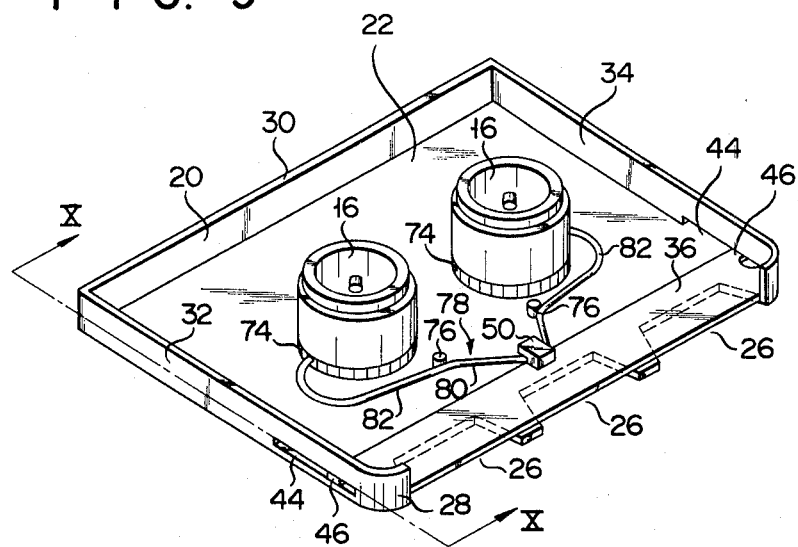
FIG. 9 is a perspective view of a tape cassette showing a modification of an embodiment according to the invention.

As shown in FIG. 9, the pair of the reel hubs 16 are rotatively held on the inner surface of the lower holding plate 22 of the housing 20. A plurality of grooves 74 are formed on the peripheral surface of the pair of the reel hubs 16 near the lower holding plate 22 of the housing 20 of the tape cassette 12.

A pair of projections 76 are disposed between the shutter member 36 and the reel hubs 16. The pair of projections 76 are disposed substantially symmetrically with respect to a line rectangularly crossing a segement connecting the centers of the reel hubs 16 at the midpoint of the segment. The pair of the projections 76 are formed integrally with the lower plate 22 at a location equidistantly apart from the urging means holder member 50 of the shutter member 36. That is, the projections 76 are fixed to the lower holding plate 22.

Between the shutter member 36 and the pair of projections 76, an urging means 78 is disposed, as shown in FIG. 9. The urging means 78, which is a resilient metal spring such as a steel wire, is incurved at the center. The center of the incurved portion 80 of the urging means 78 contacts with the holder member 50 of the shutter member 36. The holder member 50 has a stepped portion contacting the upper portion and the front portion of the center of the incurved portion 80 of the urging means 78, thereby to limit the upward movement of the urging means 78 in FIG. 9. Both ends of the incurved portion 80 of the urging means are disposed near the pair of projections 76.

One of both ends of the incurved portion 80 extends toward the left wall portion 32 of the housing 20 of the tape cassette 12, while the other end of the incurved portion 80 extends toward the right wall portion 34 of the housing 20 of the tape cassette 12. A pair of extending portion 82 of the urging means 78 contact with the pair of projections 76 of the housing 20. Accordingly, the urging means 78 is press-held between the pair of projections 76 and the shutter member 36. The pressheld urging means 78 urges the shutter member 36 to the first position, as shown in FIG. 9. One of the ends of the pair of extending portions 82 of the urging means 78 approaches the left wall portion 32 of the housing 20 beyond the peripheral surface of the corresponding one of the two reel hubs 16 and then incurves toward the peripheral surface of the reel hub 16. The end of the extending portion 82 engages one of the plurality of grooves of the reel hub 16. Similarly, the end of the other extending portion 82 of the urging means 78 approaches to the right wall portion 34 of the housing 20 beyond the peripheral surface of the remaining reel hub 16 and then incurves toward the peripheral surface of the reel hub 16. The end of said other extending portion 82 engages one of the grooves 24 of the other reel hub 16, as shown.

Figure 10:
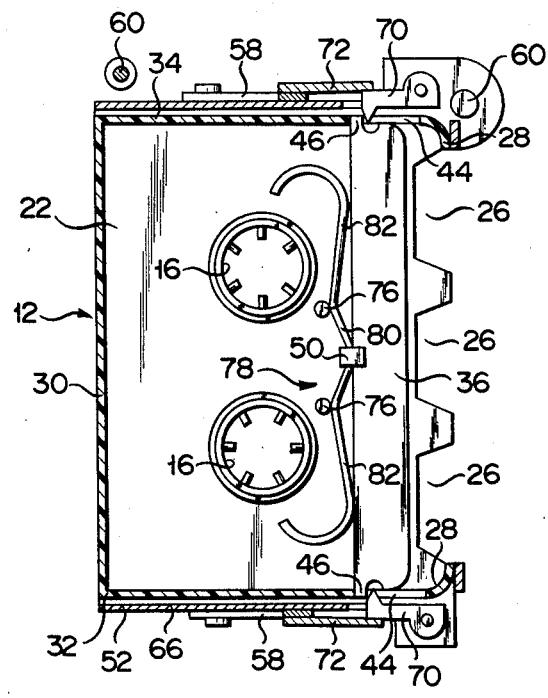
FIG. 10 is a plan view for illustrating when the tape cassette taken on line X—X of FIG. 9 is fully loaded into the tape cassette holder member in which the shutter member is in the second position and an urging member such as a brake means is disposed separated from a pair of reel hubs.

In the present modification, the one ends of the pair of engaging members 70 of the tape cassette holder member 52, respectively, engage the front ends of the pair of elongated holes 44 of the tape cassette 12. When the shutter member 36 shifts from the first position to the second position, the incurved portion 80 of the urging means 78 is pressed by the holder means 50 and the pair of projections 76, and both ends of the incurved portion 80 move toward the left and right wall portions 32 and 34 of the housing 20, so that the incurved portion 80 is deformed. The deformation of the incurved portion 80 causes one of the ends of the extending portion 82 to approach to the left and front wall portions 32 and 28, as shown in FIG. 10. Similarly, the same deformation causes the end of the other extending portion 82 to approach to the right and front wall portions 34 and 28. Accordingly, when the loading of the tape cassette 12 into the tape cassette holder member 52 is completed, that is, when the shutter member is in the second position, the reel hubs 16 are rotatable.

In removing the tape cassette from the tape cassette holder member 52, when the shutter member 36 is moved from the second position to the first position, both ends of the incurved portion 80 of the urging means move away from the left and right wall portions 32 and 34, so that the incurved portion 80 is deformed. The deformation of the incurved portion 80 causes the end of one of the extending portions 82 to move away from the left and front wall portions 32 and 28. Similarly, the same causes the end of the other extending portion 82 to move away from the right and front wall portions 34 and 28. Accordingly, when one end of the pair of the engaging members 70 of the tape cassette holder member 52 is positioned at the front end of the pair of the elongated holes 44 of the cassette 12, the ends of the pair of extending portions of the urging means 78, respectively, engage in one of the grooves of the reel hubs 16, respectively. The result is the blocking of the rotation of the reel hubs 16.

As described above the magnetic record tape protective device for a tape cassette removably loaded into a tape cassette loading section of a magnetic tape transport device, having at least one reel hub, a magnetic recording tape wound around the reel hub, and a housing including a pair of holding plates for rotatively holding said reel hub, a peripheral wall formed continuously to the holding plates for connecting the holder plates, and windows allowing a pinch roller and a magnetic head to be inserted therethrough, which is formed extending from the peripheral wall to at least one of the holding plates, is comprised of a shutter member moveable between a first position to close a holding-plate forming portion of the window and a second position to release the closing state of the holding plate forming portion, urging means for urging the shutter member provided in the housing to the first position, and drive means provided for the shutter member, which moves the shutter member from the first position to the second position in cooperation with the tape cassette loading section when the tape cassette is loaded into the tape cassette loading section.

With such a construction, when the tape cassette with the insertion window formed extending from the peripheral wall to at least one of the holding plates is carried without entirely covering the tape cassette, the magnetic recording tape is not deformed or damaged by an external force applied from the holding-plate forming portions of the insertion windows.

The drive means of the recording tape protective device of the invention has elongated holes formed in the surfaces of the housing disposed in opposition to the tape cassette loading section, which elongated holes extend in a direction of the movement of the housing relative to the tape cassette loading section when the tape cassette is loaded into the tape cassette loading section, and projections fixed to the shutter member and disposed in the elongated holes, which projections move along the elongated holes, engaging the tape cassette loading section when the tape cassette is loaded into the tape cassette loading section or when the cassette is removed from the loading section.

With these features, the construction of the drive mechanism may be simplified and compact.

In the magnetic recording tape protective device for a tape casse-te according to the invention, the projections are positioned within the elongated holes and the drive means is provided in the tape cassette loading section, and further comprises engaging members which engage the projections when the cassette is loaded into the tape cassette loading section or when the cassette is removed from the loading section.

This feature eliminates the need for a projection from the external surface of the housing of the tape cassette. Therefore, it is prevented that the shutter member is accidentally moved to the second position when the tape cassette is carried.

In the magnetic recording tape protective device for a tape cassette according to the invention, the urging means is a resilient metal wire spring, at least one of the holding plates has a projection and the metal wire spring is press-held by the shutter member and the projection.

This feature makes the housing of the tape cassette compact, and further simplifies the constructions of the urging means and the housing.

In the magnetic recording tape protective device for a tape cassette according to the invention, the projections are shaped like a ring which fit around the peripheral surface of said reel hub to rotatively hold the reel hub. The magnetic recording tape protective device according to the invention further comprises another reel hub and another ring-like projection wherein the metal wire spring is press-held by the projections and the shutter member. These features simplify the construction of the urging means and makes the tape cassette compact.

The magnetic tape protective device for a tape cassette according to the invention further comprises brake means for blocking the rotation of the reel hubs by engaging the reel hubs in synchronism with the shutter member when the shutter member is located in the first position, and for allowing the rotation of the reel hubs by separating from the reel hubs when the shutter member is located in the second position. With this construction, when the tape cassette is carried without setting the tape cassette in a cassette case entirely covering the tape cassette, the magnetic tape wound around the reel hubs is not loosened by vibration applied to the cassette. Therefore, there is eliminated the undesirable case where the tape is pulled out through the window by the loosening of the tape.

The magnetic tape record protective device for a tape cassette according to the invention comprises two ree hubs and two projections, wherein both the projections are disposed between both the reel hubs and the shutter member, substantially symmetrically with respect to a line crossing a segment connecting the centers of both the reel hubs at the midpoint of the segment, and the metal wire spring urging means is held by both the reel hubs and the shutter member, contacting the shutter member at a location equidistantly apart from both of the projections. This feature allows the urging means to be housed in the housing of the tape cassette without blocking the rotation of the reel hubs. Further, the tape cassette is made compact.

In the magnetic record tape protective device for a tape cassette according to the invention, the metal wire spring contacts the shutter member at a midpoint between both ends thereof, and further contacts both the projections at a location equidistantly apaprt from the midpoint. Both the ends of the metal wire, respectively, engage both of the reel hubs when the shutter member is located in the first position and both of the ends, respectively, detach from both of the reel hubs when the shutter member is in the second position. This construction simplifies the construction of the braking means and further ensures a reliable braking operation.

In the magnetic record tape protective device for a tape cassette according to the invention, a plurality of grooves are formed around the peripheral surface of each of the reel hubs. This feature increases the reliability of the braking operation to block the rotation of the reel hubs.

While the invention has been described in its preferred embodiments, obviously modifications and variations are possible in the light of the above teachings. It is therefore to be understood that within the scope of the invention, the invention may be practiced otherwise than as specifically described.

For example, the urging means 48 may be fixed to any one of the front wall portion 28, the left wall portion 32 or the right wall portion 34 of the housing and at the other end to the shutter member 36.

The drive means may be a projecting member formed on the surface of the shutter member 36 of the cassette loaded into the tape cassette holder member 52, which is disposed in opposition to the surface of the shutter member 36 exposed to the holding-plate forming portions of the insertion windows 26. The projecting member is disposed within the movement path of the shutter member 36 on the surface of the shutter member 36 exposed to the peripheral-wall forming portions of the windows. When the tape cassette is inserted into the tape cassette holder member 52, it contact the surface of the shutter member 36 exposed to the peripheral-wall forming portions of the windows. Therefore, when the cassette is inserted into the tape cassette holder member 36, the shutter member 36 is moved from the first position to the second position, resisting the urging force by the urging means 72.

The brake means may be such a member extending along the right or left wall portions 34 and 32 rearward beyond the pair of reel hubs 16 as viewed from the shutter member 36 toward the rear side, which engages the peripheral surfaces of the pair of reel hubs 16 from the rear to stop the rotation of the reel hubs when the shutter member is in the first position and it releases its engagement with the peripheral surfaces of the reel hubs 16.

What we claim is:

1. A magnetic recording tape protective device for a tape cassette removably loaded into a tape cassette loading section of a magnetic tape transport device, the tape cassette having a housing, at least one reel hub in said housing, and a magnetic recording tape in said housing and wound around said at least one reel hub, said housing including a pair of spaced apart holding plates for rotatively holding said reel hub, a peripheral wall formed continuously to said holding plates for connecting said holding plates, and at least one window allowing a pinch roller and a magnetic head to be inserted therethrough, said at least one window extending from said peripheral wall to at least one of said holding plates, the portion of said window in said at least one holding plate being a holding-plate forming portion of said at least one window, said protective device comprising:

a shutter member mounted in said housing and being movable between a first position to close said holding-plate forming portion of said at least one window and a second position to release the closed state of said holding-plate forming portion of said at least one window, thereby opening said at least one window;

urging means coupled to said shutter member for urging said shutter member to said first position; and drive means at least partially provided on said shutter member for moving said shutter member from said first position to said second position in cooperation with said tape cassette loading section when the tape cassette is loaded into said tape cassette loading section, said drive means including an elongated hole formed in a surface of a housing disposed in opposition to said tape cassette loading section, said elongated hole being elongate in a direction of the movement of said tape cassette housing relative to said tape cassette loading section when the tape cassette is loaded into said tape cassette loading section; a projection fixed to said shutter member and slideably mounted in said elongated hole so as to be movable along said elongated hole in said direction of movement of the tape cassette relative to the loading section; and means in said tape cassette loading section for engaging said projection of said shutter member and for sliding said projection in said elongated hole to move said shutter member to said second position when the tape cassette is loaded into said tape cassette loading section.

2. The magnetic tape protective device of claim 1, wherein said projection of said shutter member is positioned within said elongated hole; and said drive means further comprises engaging means provided in said tape cassette loading section for engaging said projection of said shutter member when the tape cassette is loaded into said tape cassette loading section or when the tape cassette is removed from the tape cassette loading section.

3. The magnetic tape protective device of claim 1 or 2, comprising a pair of projections extending from said shutter member, and a pair of said elongated holes each receiving therein a respective one of said projections of said shutter member.

4. The magnetic tape protective device of claim 3, wherein said shutter member is a substantially flat elongated member, and said projections thereof extend from respective opposite ends thereof.

5. The magnetic tape protective device of claim 1 or 2, wherein said urging means comprises a resilient elongated spring member; and wherein at least one of said holding plates has a projection thereon; said elongated spring member being press-held by said shutter member and said projection of said holding plate.

6. The magnetic tape protective device of claim 5, wherein said elongated spring member is a resilient wire spring.

7. The magnetic tape protective device of claim 5, wherein said projection of said at least one holding plate is ring shaped and fits around the peripheral surface of at least one of said reel hubs to rotatively hold said reel hub.

8. The magnetic tape protective device of claim 7, further comprising another reel hub and another ring-like projection on said at least one holding plate; and wherein said elongated spring member is press-held by said projections of said at least one holding plate and said shutter member.

9. The magnetic tape protective device of claim 8, wherein said elongated spring member is a resilient wire spring.

10. A magnetic tape protective device of claim 1 or 2, further comprising brake means for blocking the rotation of said reel hub by engaging said reel hub when said shutter member is located in said first position, and being actuable by said drive means for allowing the rotation of said reel hub by separating from said reel hub when said shutter member is moved to said second position.

11. The magnetic tape protective device of claim 10, wherein said brake means at least partly includes said urging means.

12. The magnetic tape protective device of claim 5, further comprising another reel hub and another projection on said at least one holding plate, wherein both of said projections of said at least one holding plate are disposed between both of said reel hubs and said shutter member, substantially symmetrically with respect to a line crossing a segment connecting the centers of both of said reel hubs at the midpoint of said segment; and said elongated spring member is held by both said projections of said at least one holding plate and said shutter member, said elongated spring member contacting said shutter member at a location equidistantly apart from both of said projections of said at least one holding plate apart from both of said projections of said at least one holding plate.

13. The magnetic tape protective device of claim 12, wherein said elongated spring member is a resilient wire spring.

14. The magnetic tape protective device of claim 12, wherein said elongated spring member has two ends and contacts said shutter member substantially at a midpoint between both ends thereof, and further contacts both of said projections of said at least one holding plate at a location substantially equidistantly apart from said midpoint, both of said ends of said elongated spring member, respectively, engaging both of said reel hubs when said shutter member is located in said first position, and both of said ends, respectively of said elongated spring member being spaced from both of said reel hubs when said shutter member is moved against said elongated spring member to said second position.

15. The magnetic tape protective device of claim 14, wherein a plurality of grooves are formed around the peripheral surface of each of said reel hubs for engagement with the ends of said elongated spring member.

16. The magnetic tape protective device of claim 14, wherein said elongated spring member is a resilient wire spring.

17. The magnetic tape protective device of claim 2, wherein said shutter member is a substantially flat elongated member and said drive means comprises a pair of projections extending from respective opposite ends of said elongated shutter member, said housing having a pair of said elongated holes disposed on opposite sides thereof for respectively receiving a projection of said shutter member, said projections of said shutter member being slideable in said respective elongated holes in said direction of movement of said tape cassette housing relative to said tape cassette loading section when the tape cassette is loaded into said tape cassette loading section;

said engaging means provided in said tape cassette loading section comprising respective engaging members at opposite sides of said tape cassette loading section for engaging respectively said projections of said shutter member; said engaging members being spring-biased in a direction to enter respective elongated holes in said tape cassette housing when said tape cassette is loaded into said tape cassette loading section and engaging said projections of said shutter member when said tape cassette is pushed into said tape cassette loading section to move said shutter member to said second position.

18. The magnetic tape protective device of claim 17, wherein said projections of said shutter member do not extend outwardly of the external surface of said housing of said tape cassette.

* * * * *